United States Patent [19]
Becknell

[11] 3,829,154
[45] Aug. 13, 1974

[54] VEHICULAR RETRACTABLE COVER
[76] Inventor: William R. Becknell, P.O. Box 64, Joiner, Ark. 72350
[22] Filed: June 25, 1973
[21] Appl. No.: 373,005

[52] U.S. Cl.................. 296/98, 296/100, 160/23 R
[51] Int. Cl............................................... B60j 7/06
[58] Field of Search...... 296/137 D, 137 B, 98, 100; 160/23, 84 R; 200/33 C; 308/32, 15; 226/194

[56] References Cited
UNITED STATES PATENTS
| | | | |
|---|---|---|---|
| 1,615,513 | 1/1927 | Heywood | 296/98 |
| 2,236,136 | 3/1941 | Gorman | 200/38 C |
| 3,318,367 | 5/1967 | Bray | 226/194 X |
| 3,766,958 | 10/1973 | Mitchell | 160/84 R |
| 3,768,540 | 10/1973 | McSwain | 160/23 R |

Primary Examiner—Robert B. Reeves
Assistant Examiner—John P. Shannon
Attorney, Agent, or Firm—J. Gibson Semmes

[57] ABSTRACT

In a retractable vehicular cover of the tarpaulin type, a remotely controllable system for the opening and closing of the container or trailer. The invention is particularly adapted to tractor-trailers and trucks.

1 Claim, 5 Drawing Figures

3,829,154

VEHICULAR RETRACTABLE COVER

BACKGROUND OF THE INVENTION

The best of the known art for grain truck covers and the like is exemplified in such patents as Hughes U.S. Pat. No. 3,138,399, Sargent U.S. Pat. No. 3,384,413 and Dahlman U.S. Pat. No. 2,976,082 as well as Daniels U.S. Pat. No. 2,510,307 and Campbell U.S. Pat. No. 473,292. In each of these, an effort has been made to extend a cover over a vehicular truck or trailer, the respective covers extending sidewise, as opposed to lengthwise of the vehicle. Nonetheless, attendant difficulties in insuring that the cover will remain in place at the time of reeling in and reeling out, during and following loading of the vehicle from the top has presented numerous problems. Additionally, no suitable means for remotely controlling the reeling in and out of flexible covers has been devised nor has means for insuring that the cover be sustained against tearing in transit and while reeled in. With these and other disadvantages in the known art, the present invention may be defined as follows.

DESCRIPTION OF THE PREFERRED EMBODIMENT

Figure 1:
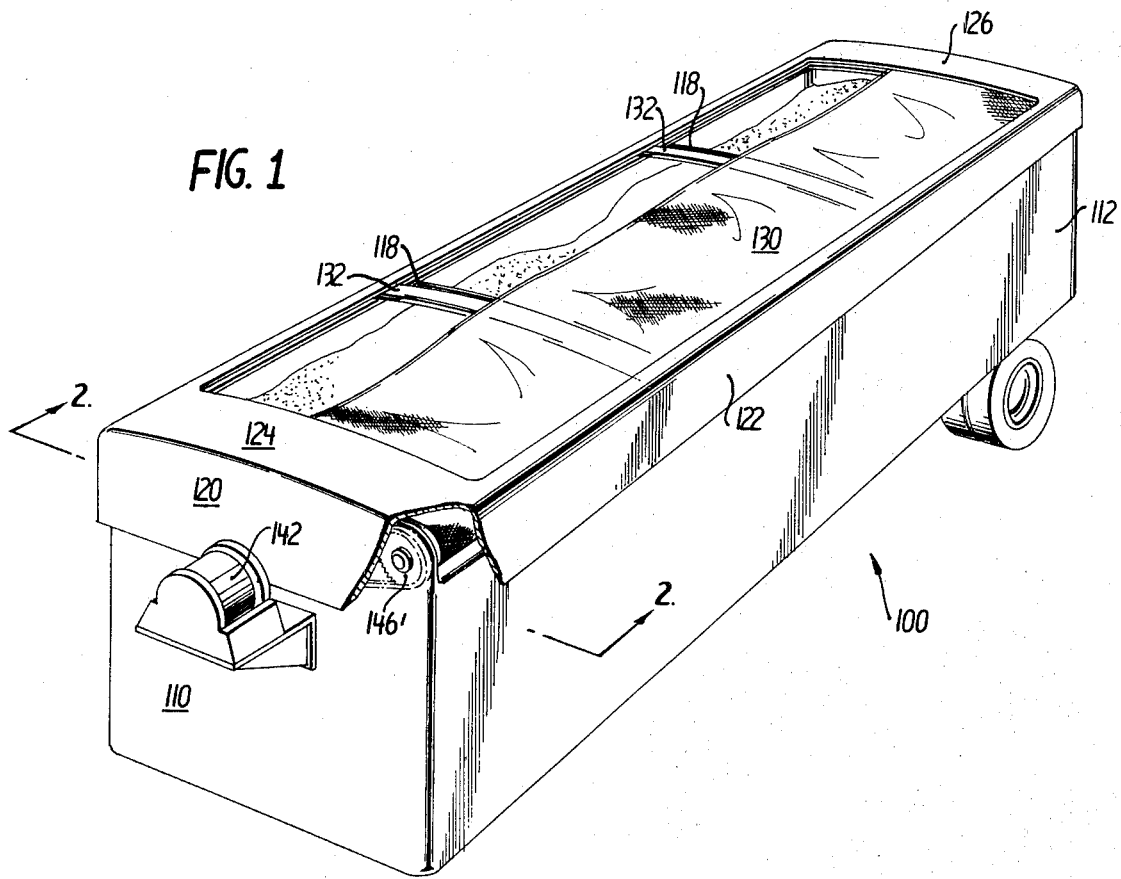
FIG. 1 is a view in perspective of invention showing the cover partially closed.

With reference to FIG. 1, a tractor-trailer 100 is depicted, said unit including front and rear walls 110 and 112 respectively and sidewalls 114. The sidewalls 114 are adapted to secure in the uppermost portion thereof means for paying in and paying out a cover. Said sidewalls include depressions 116, terminated at ends by the walls 110 - 112 respectively of the trailer. At the topmost portion of the depressions 116 which extend lengthwise of the walls 114 and the trailer, per se, are ribs or braces 118 connecting across the respective top portions of the walls 114, transversely. The ribs are removeable for cargo handling ease, when required. These ribs 118 include fixed flanges 118' extending upwardly from both sides thereof, sufficiently to guide the webs 132 of the tarpaulin 130 as will be hereinafter described.

Ideally, an open topped cover 120 is superposed over the entire structure, said cover 120 including sides 122 and forward extension 124 as well as rearmost extension 126, superposed over the forward and rearwardmost portions of the cover, per se. The forwardmost visor 124 may include an upright aerodynamic foil section to prevent undue turbulence at the tarp, but this is not shown.

The tarpaulin 130 is adapted to transverse reeling in and reeling out so that the trailer may be filled from the top. Said tarpaulin 130 includes at least two web-like straps 132 which are of sufficient length to accommodate the open width of the tractor in the course of filling thereof and have sufficient length also to ensure wrapping about the idler 146 of the driving mechanism 140, hereinafter described.

Figure 3:
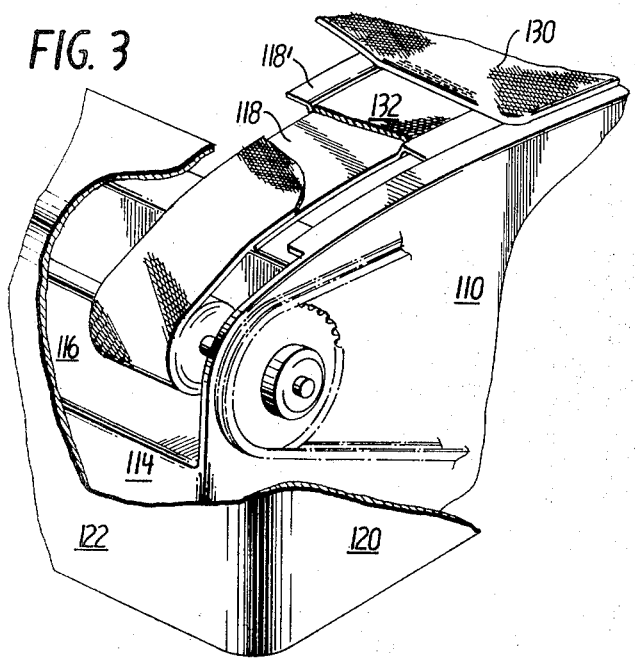
FIG. 3 is an enlarged fragmentary view of a portion of the construction depicted in FIG. 1.

The straps 132 are adapted to ride guidedly in the respective connecting ribs 118. They are guided against displacement by the flanges 118', illustrated in FIG. 3.

Figure 5:
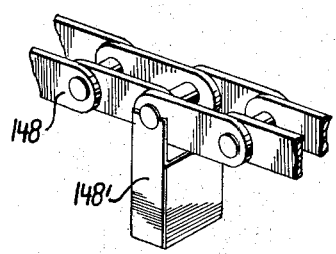
FIG. 5 is an enlarged fragmentary view of means used in transmitting power and in the control of power input to the system.

The system 140 which is adapted to pay in and pay out the tarpaulin and its connecting webs 132 comprises a driving motor 142, connecting to a driving sprocket 144, said sprocket engaging the idlers 146 and 146' by means of the endless chain 148, said endless chain having at least two projections 148' extending therefrom - reference FIG. 5. These projections 148' are adapted to engage and disengage appropriate microswitches 150-150' for automatic actuation and deactuation of the driving motor 142.

Figure 2:
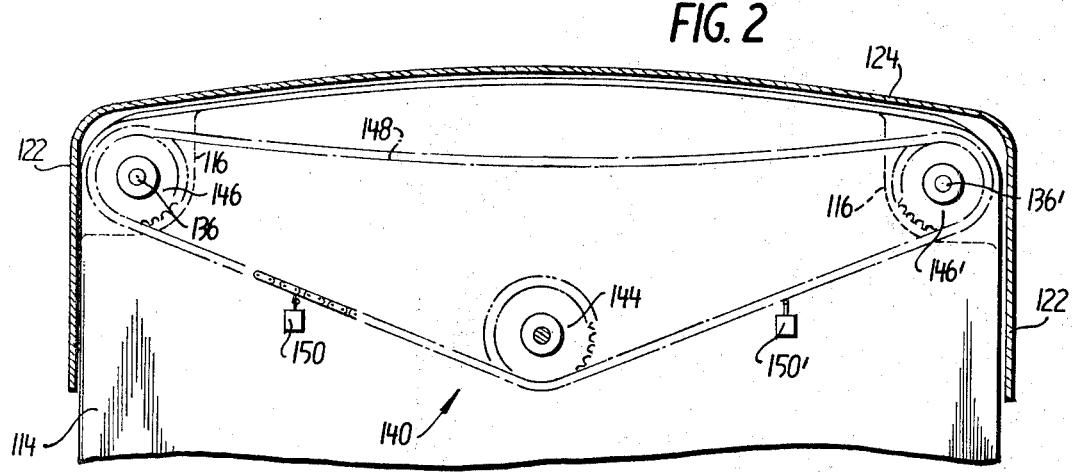
FIG. 2 is a view in vertical section of invention taken along the lines 2—2 of FIG. 1.
Figure 4:
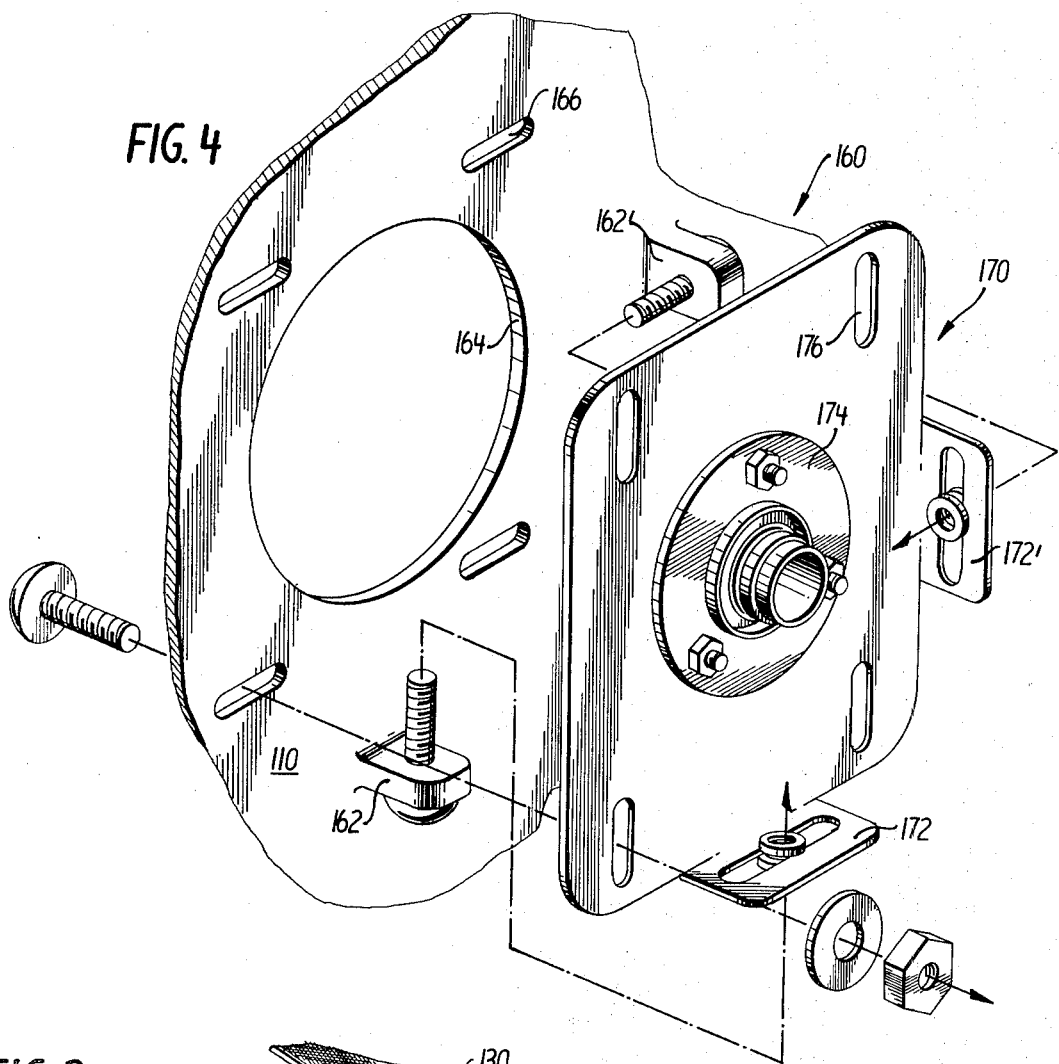
FIG. 4 is an enlarged fragmentary view of a portion of the bearing mechanism used in the cover power actuated reeling system.

To ensure that the respective reeling mechanisms, represented by the idlers 146 and 146', reference FIG. 2, shall remain in tension relation to the tarpaulin and its connected webs, there is shown in FIG. 4 the bearing adjustment system 160 - 170. A portion of wall 110 thus includes projections 162 and 162' for mounting the adjustment plate 170 by means of corresponding flanges 172 - 172'. Within the wall 110 are reel apertures 164 and transverse openings 166, adapted to permit transverse adjustment of the plate 170 relative to the fixed portion 160 of the wall 110. It will be appreciated that a comparable system, adapted to the rearmost wall 112 would permit transverse and vertical adjustment of the reel, fixed to idler 146, relative to the reel of idler 146'. Within the adjusting plate 170 are comparable apertures 176, adapted for vertical adjustment and fixation, relative to the apertures 166 and the bearing mechanism 174 itself is adapted to adjustable alignment with the corresponding apertures 164 of the system 160. The functioning of the respective reels 136 - 136', relative to the tarpaulin 130 and its connecting straps 132 will be obvious from an examination of the drawings.

In operation, it will be seen that upon actuation of the reversible driving mechanism 140 via the driving motor 142, as the driving mechanism moves in a clockwise direction, the tarpaulin 130 is reeled in on reel 146' and by pre-arrangement, the projection 148' will engage corresponding microswitch 150 to deactivate the driving mechanism, whereupon as the tarpaulin is reeled in and the trailer top is fully opened with the exception of the connecting straps 132. The trailer may be filled and the reverse operation set in motion by manual actuation of the driving mechanism in the opposite direction. To ensure the taut reeling in, reeling out and travelling function of the tarp, suitable adjustments may be made to the idler 146 by means of the movement of the bearing plate 170 relative to the corresponding portion 160 of walls 110 and 112, respectively.

With the foremost objectives in mind, the invention is defined by the following claims;

1. In an open-top vehicular container, flexible cover apparatus comprising:

A. two reels bearing in the container, extending lengthwise thereof;

B. a flexible cover anchored to one of the bearing reels, containing at least two webs which circumferentially engage the other bearing reel;

C. means to drive the reels alternately clockwise and counterclockwise;
D. transverse brace means secured to top sides of the container to provide support to the web;
E. adjustable bearing plate supports which allow adjustment of the tension of the webs and driving means by lateral movement of the supports; and
F. automatically engageable means to activate and de-activate the reel driving means.

* * * * *